United States Patent [19]

Iannini

[11] 3,823,506

[45] July 16, 1974

[54] INSECT TRAP WITH SAFETY FEATURES

[75] Inventor: Robert E. Iannini, Milford, N.H.

[73] Assignee: Rid-O-Ray, Inc., Nashua, N.H.

[22] Filed: Feb. 5, 1973

[21] Appl. No.: 329,720

[52] U.S. Cl. .............................................. 43/112
[51] Int. Cl. ............................................ A01n 1/22
[58] Field of Search ........................ 43/112, 98, 113

[56] References Cited
UNITED STATES PATENTS

| | | | |
|---|---|---|---|
| 3,346,988 | 10/1967 | Pickering | 43/112 |
| 3,473,251 | 10/1969 | Kahn | 43/112 |
| 3,680,251 | 8/1972 | Springer | 43/112 |

FOREIGN PATENTS OR APPLICATIONS

| | | | |
|---|---|---|---|
| 1,515,795 | 1/1968 | France | 43/112 |

Primary Examiner—Antonio F. Guida
Assistant Examiner—J. Q. Lever
Attorney, Agent, or Firm—Pearson & Pearson

[57] ABSTRACT

A fluorescent tube, meshed electrode type insect trap has the upper portion of each tube passing through a hole in the lower mounting plate of a hollow cover so that the upper socket, reversed starter and all other components are protected from the elements. The exposed lower part of each tube and the high voltage grids depend below the mounting plate and are encompassed by a non-electrified, fine mesh cage with fine mesh bottom for safety of the user. A flat pair of electrodes may be straddled by a pair of tubes or a pair of cylindrical electrodes may encircle a single tube.

9 Claims, 6 Drawing Figures

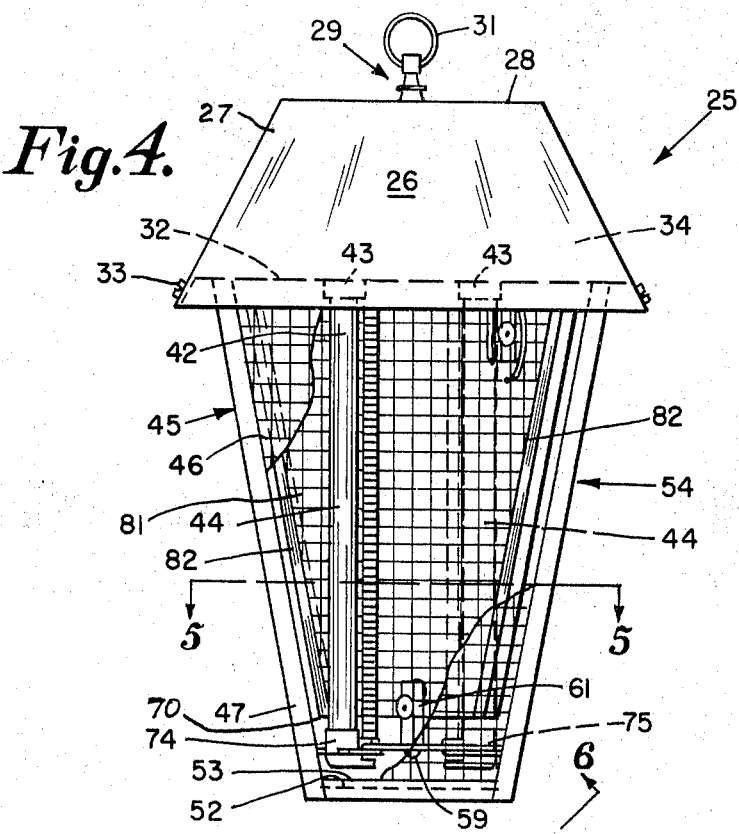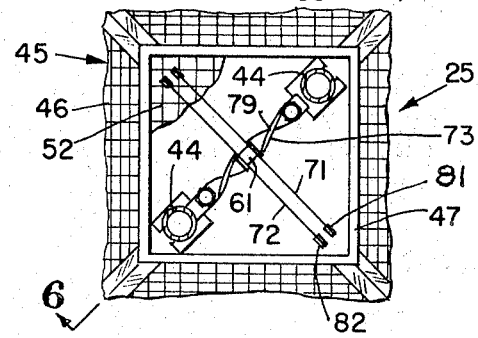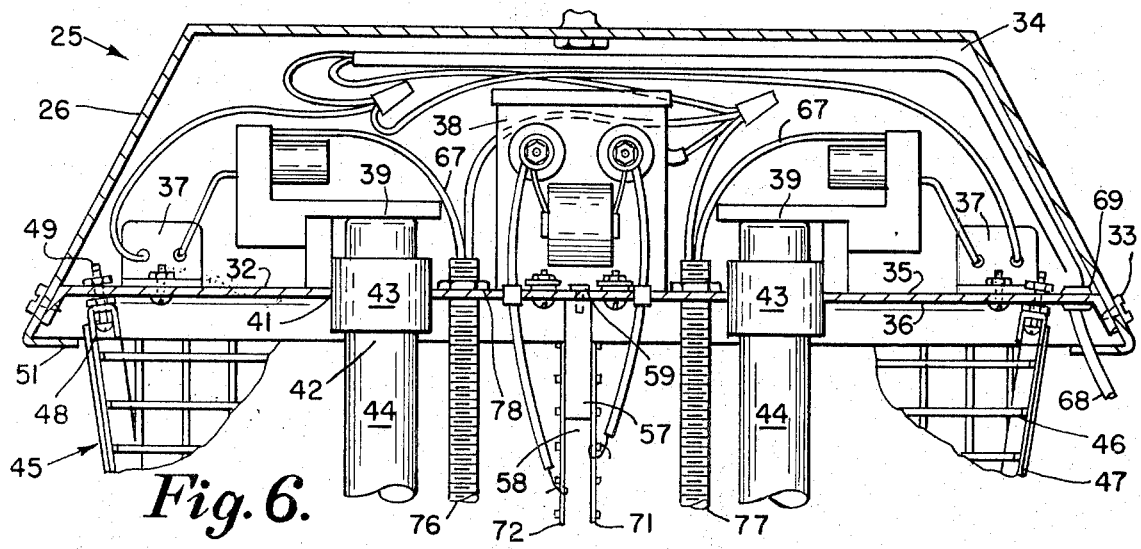

INSECT TRAP WITH SAFETY FEATURES

BACKGROUND OF THE INVENTION

It has heretofore been proposed, as in my design U.S. Pat. application Ser. No. 144,396 filed May 17, 1971, now U.S. Pat. No. D226,729 and Ser. No. 144,397 also filed May 17, 1971, now U.S. Pat. No. D226,582 to provide an insect trap of colonial lantern configuration having a cover from which a pair of spaced high voltage electrode grids depend, there being a pair of fluorescent tubes inside the grids and the bottom of the grids being open to permit insect bodies to fall out.

These bug killer devices, and those of other manufactures, have proved commercially acceptable and popular, as have a cylindrical cover, concentric cylindrical electrode, double tube type, the latter also having an open bottom to discharge insect litter or permit changing of tubes.

In the prior art devices it has apparently been thought necessary to affix the upper sockets, for the tubes and the tube starters, or for the bulbs, in an exposed position on the lower face of the bottom mounting plate of the cover for ease of replacement, despite the obvious danger of damage by the weather. Similarly, one of the high voltage grids has usually been used as the outside mesh of the device, perhaps on the theory that it was enough to expect the insect to fly through one set of mesh into the high voltage field between grids and not through first a non-electrode grid and then through an electrode grid.

Exemplary of prior art insect traps having a light source, a pair of cylindrical, spaced-apart, fine-meshed electrodes and a horizontal, annular, fluorescent tube in U.S. Pat. No. 3,177,609 to DeMarco of Apr. 13, 1965. While the dome of the DeMarco device is hollow, the ballast and starter are affixed to the underside of the dome lower plate within a large cover and there is no non-electrified, fine mesh, outside cage to safeguard human fingers. Another earlier insect trap is shown in U.S. Pat. No. 1,848,614 to Folmer of Mar. 8, 1932, wherein a single electrode cage encircles an ordinary light bulb, the bulb socket being exposed below the mounting plate of a hollow dome, and an outer protective wire grille of large mesh, supporting a collection pan, is detachably affixed to the mounting plate.

SUMMARY OF THE INVENTION

In this invention, the insect trap is preferably of colonial lantern configuration with an upper, overhanging, truncated, pyramidal cover and a lower, inverted, truncated, pyramidal, cage-like enclosure of relatively fine open mesh, small enough to prevent the fingers being inserted but large enough to pass flies, mosquitoes and other insects of similar size.

Unlike the above mentioned patents, the light source is at least one vertically extending fluorescent tube, preferably black, and the upper end of each tube is rubber sleeved to pass through a hole in the mounting plate of the hollow cover into an upper socket protected within the cover. The tube starter is reversed and protected within the cover, as are the ballast, transformer and any other components, rather than being exposed below the plate as in the prior art.

The outside protective cage of the insect killer, which is of fine mesh, is fixed to the underface of the mounting plate and is non-electrified. A fine-meshed bottom member extends across the lower portion of the protective cage and is also non-electrified, so that there is no danger due to human touch or insertion of the fingers.

The high voltage electrodes are formed by a pair of fine mesh wire electrodes, uniformly spaced apart and supported by insulative blocks also fixed to the underface of the mounting plate. The electrodes may be a pair of meshed cylinders concentric with a single vertical tube or a pair of vertical tubes may straddle a flat tapered pair of parallel meshed electrodes of truncated pyramidal configuration.

BRIEF DESCRIPTION OF THE DRAWING

FIG. 4 is a view similar to FIG. 1 of another embodiment of the invention in which a pair of vertical fluorescent tubes straddle a flat planar pair of meshed electrodes, FIG. 5 is a bottom view of the insect trap of FIG. 4, and FIG. 6 is an enlarged fragmentarty side elevation on line 6—6 of FIG. 5.

DESCRIPTION OF THE PREFERRED EMBODIMENT

Figure 1:
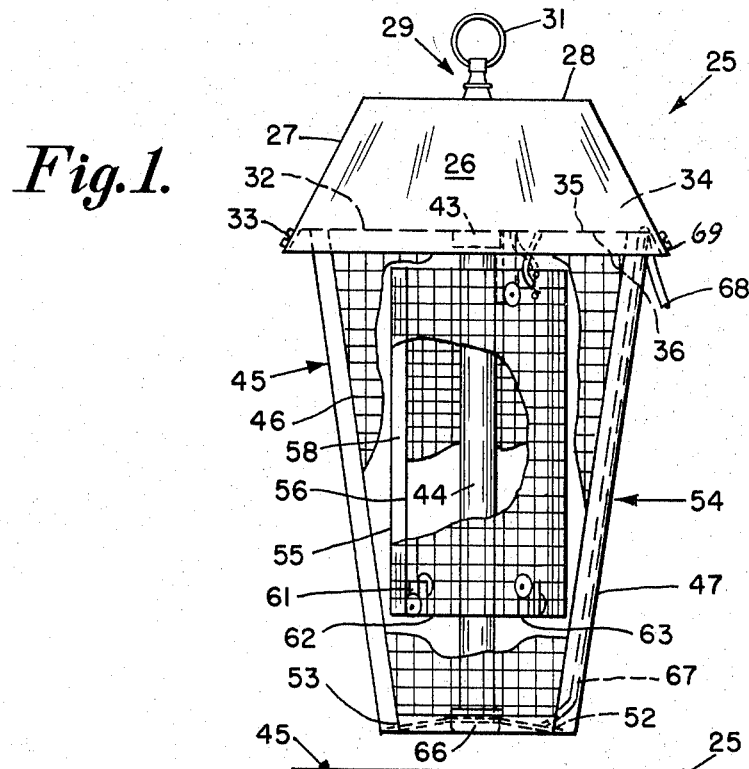
FIG. 1 is a side elevation of one embodiment of the invention in which cylindrical meshed electrodes are concentric around a single fluorescent tube.

As shown in the drawings, the insect trap 25 of the invention is preferably of colonial lantern configuration, although it will be obvious that it could be of any other attractive or functional design which would serve its purpose.

Insect trap 25 includes a hollow cover 26, of imperforate sheet material 27, such as metal, and is of generally truncated pyramidal configuration with an upper suspension plate, or panel, 28 having suspension means 29 affixed thereto in the form of a loop 31, whereby the trap may be hung from a post or tree. The trap 25 also includes a bottom mounting plate 32 which is detachably affixed by suitable screws 33 under the cover 26 to define the chamber, or enclosure, 34 in which all of the moisture-sensitive electric components of the unit are contained and protected from the elements.

The mounting plate 32 includes an upper face 35 and a lower face 36, there being a ballast 37, transformer 38 and an upper tube socket 39, all mounted on the upper face 35 within the chamber 34. Mounting plate 32 also includes a hole 41 through which the upper end 42, encircled by a rubber sleeve seal 43, of each vertical, black fluorescent tube 44 is received for insertion in and support by its upper socket 39.

In each embodiment of the invention an outer protective cage 45, preferably of inverted truncated pyramidal configuration, is provided, the cage 45 being formed of relatively fine wire mesh 46, such as mesh of about ½ inch square or less, so that adult fingers cannot be inserted. The protective cage 45 includes metal edge trim 47, of angular cross section, on each upstanding corner and a folded-over, inverted U-shaped, upper edge trim 48, there being fastening screws 49 threaded through the trim and into the mounting plate 32 to permanently fix the cage 45 in position under the overhang 51 of cover 26.

In each embodiment of the invention, a protective bottom member 52, preferably also formed of the fine wire mesh 46, extends across the lower portion 53 of the protective cage 45 to prevent admission of fingers while permitting insect litter to fall out of the cage.

The protective cage 45 with its bottom member 52 and its hollow cover 26, together constitute a non-electrified safety housing 54 which completely encloses the vertical tubes 44 and high voltage meshed electrodes and which is spaced a predetermined distance outside and around the same, so that any fingers of a size to penetrate the mesh will be too short to reach the electrodes. Thus, while a child's index finger might pass through the mesh 46, it will be too short to extend to the nearest meshed electrode and at no time could reach both electrodes to thereby expose the child to the high voltage field between the electrodes.

Figure 2:
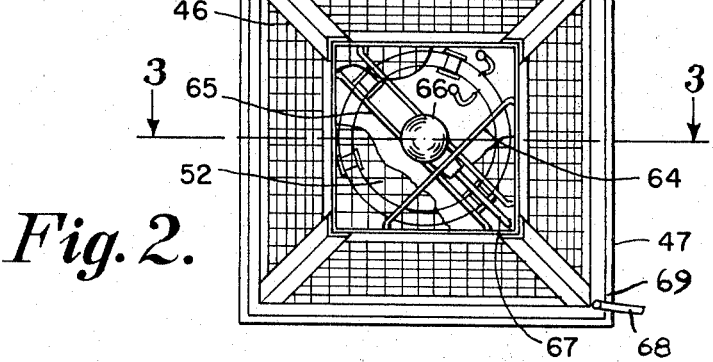
FIG. 2 is a bottom view of the device shown in FIG. 1.
Figure 3:
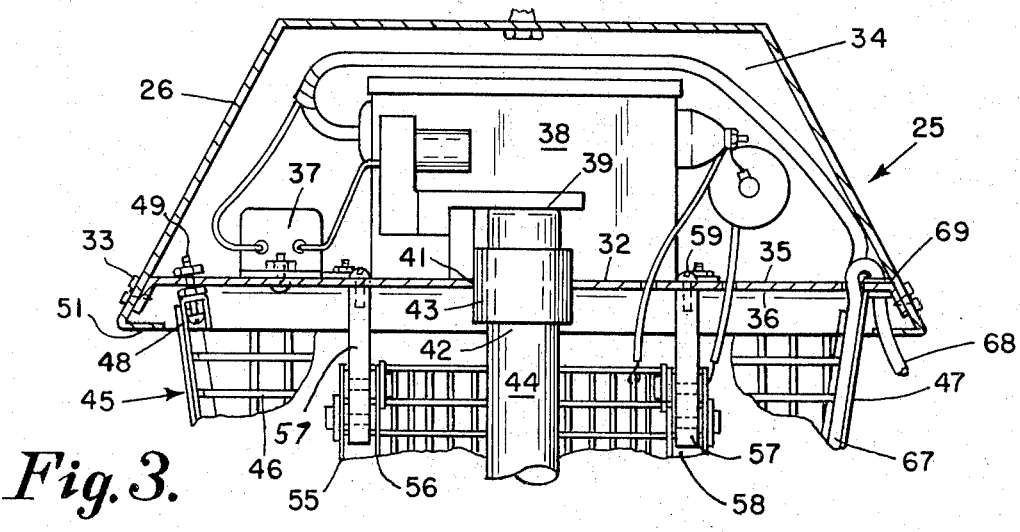
FIG. 3 is an enlarged fragmentary side elevation in section on line 3—3 of FIG. 2.

In the embodiment of FIGS. 1, 2 and 3, a single vertical fluorescent tube 44 extends along the central vertical axis of the housing 54 and is encircled by a pair of concentric, high voltage, spaced, meshed electrodes 55 and 56. Insulative blocks 57, of Teflon or the like, are located in the upper part of the high voltage field 58, between the electrodes, and are affixed by screws 59 to the underface 36 of mounting plate 32 to support the electrodes. Similar blocks 61 in the lower portion 62 of the electrodes connect the same, the bottom edges 63 being at a spaced height above the meshed bottom member 52 to prevent finger contact.

The bottom member 52 includes diagonal reinforcing cross braces 64 and 65, which support the lower socket 66 of tube 44, the lead wire, or conductor, 67 extending up the inside of the corner edge trim 47. The power cord 68 for the trap 25 enters at he maximum outside point on the cover, as at 69, to prevent rotation by the wind when the trap is hanging.

In the embodiment of FIGS. 4, 5 and 6, a pair of vertical fluorescent tubes 44 are mounted parallel to the central vertical axis of the trap 25, each at an equal spaced distance inside the protective cage 45 and each at an equal spaced distance outside a pair of flat, planar, uniformly spaced, high voltage, meshed electrodes 71 and 72. Electrodes 71 and 72 are of generally inverted truncated pyramidal configuration to conform to the shape of the cage 45, while extending diagonally across the center thereof between the tubes 44.

Like the cylindrical electrodes 55 and 56, insulative blocks 57 in the high voltage field connect the upper portions of the electrodes and are affixed by screws 59 to the underface 36 of mounting plate 32. The lower insulative block 61 is affixed by screws 59 to the center of a socket bracket 73 so that the bottom edge 70 of the electrodes are at a spaced distance above the meshed bottom member 52.

The socket bracket 73 carries a lower tube socket 74 or 75 at each opposite end thereof and is stabilized by a pair of hollow tubular rods 76 and 77 which are affixed to mounting plate 32 by nuts 78. The lead wires, or conductors, 67 for the tubes are threaded through the tubular rods 76 or 77, so that they are protected from the weather.

Because of the vertically positioned tubes and the elimination of any depending covers, ballast, transformers, light bulb sockets or annular tubes such as in the DeMarco device of U.S. Pat. No. 3,177,609, or other prior art patents, the insect trap of this invention can be seen through from one side to the other, which gives a better lantern effect while exposing only the tubes and high voltage grids.

The socket bracket 73 is preferably twisted to the vertical, as at 79, to present less surface to falling insect parts, thereby avoiding accumulation. The upstanding edges 81 of the flat electrodes 71 and 72 are usually cut from larger pieces of wire mesh material and, to avoid corona, a trim piece of metal, as at 82, is folded over the cut edges 81.

The cylindrical electrodes 55 and 56 and the flat electrodes 71 and 72 are uniformly spaced apart a predetermined distance of about three-eighths of an inch by the blocks 57 or 61, this being slightly greater than the dimensions of a typical mosquito; thus the insect does not quite bridge the gap, or field, 58, while the capacitance builds up. When the breakdown occurs, a high instant of current appears across the insect and the unbridged air gap blowing the insect into pieces and clear of the grids. The recovery power to charge the grids back to normal is minimal, since the inherent capacitance seldom discharges to zero when the gap is not entirely bridged. Carbon build-up on the meshed electrodes by this method of kill is virtually eliminated. A relatively small diameter size of wire, such as No. 19 gauge is used in the electrodes to create a higher gradient and a lower energy demand. Larger insects, such as large moths and beetles, will bridge the gap and be burned to ashes.

It will be noted that because the upper sockets 39 are protected within the enclosure 34 of the hollow cover, a less expensive socket may be used while still satisfying national safety codes. A standard combination fluorescent tube and starter socket has been reworked by reversing the starter socket and mounting in an insulative block used as a standoff to support the socket combination in enclosure 34.

I claim:

1. In an insect trap of the type having at least one straight fluorescent tube associated with a pair of spaced-apart, high voltage, meshed grid electrodes for attracting and electrifying insects, the improvement comprising in combination:

a non-electrified safety housing completely enclosing said tube and electrodes, said housing comprising a hollow cover of imperforate sheet material, including a top plate with suspension means for hanging said trap and a bottom mounting plate having upper and lower faces and at least one hole therein;

block means affixed to the lower face of said bottom mounting plate, spacing said electrodes apart a uniform, predetermined distance of about three-eighths of an inch;

a starter socket affixed to the upper face of said bottom mounting plate, within said cover, for supporting the upper end of each said tube to extend vertically downward through said hole in said bottom mounting plate;

a protective cage of meshed material depending from the lower face of said bottom plate and extending around said tube and electrodes at a spaced distance outside the same;

and a protective bottom member extending across the lower portion of said cage;

said hollow cover containing the remaining electric components of said trap, affixed to the upper face of said mounting plate, for shielding said components from the elements.

2. An insect trap as specified in claim 1, wherein:
said bottom member is a meshed grid reinforced by a pair of diagonal braces; and
said bottom member supports the lower socket of each said single fluorescent tube.

3. An insect trap as specified in claim 1, wherein:
said pair of electrodes are in the form of a pair of uniformly spaced, parallel, flat planar grids extending diagonally of said protective cage; and
a pair of said tubes are provided, one on each opposite side of the center of said grids within said cage.

4. An insect trap as specified in claim 3, wherein:
a socket bracket extends between the lower ends of said pair of tubes and supports the lower sockets thereof; and
a pair of hollow tubular rods extend vertically of said trap between said bracket and said mounting plate to stabilize the same.

5. An insect trap as specified in claim 4, wherein:
the lead wires to said lower sockets of said tubes are threaded in said hollow rods to protect the same.

6. An insect trap as specified in claim 4, wherein:
said flat planar grids include an insulative spacer at the bottom center thereof; and
a socket bracket extends between the lower ends of said pair of tubes to support the lower sockets thereof;
said spacer being affixed to the center of said socket bracket for mutual stabilization thereof.

7. An insect trap as specified in claim 1, plus:
a rubber sleeve extending around the upper portion of each said tube at each said hole to seal the same and prevent breakage.

8. An insect trap as specified in claim 1, wherein:
the starter socket of each said tube is reversed and mounted on an insulative block which supports the socket;
whereby the minimum length of tube is exposed to the interior of said hollow cover member.

9. In an insect trap of the fluorescent tube, meshed electrode type, the combination of:
a hollow cover having a top suspension plate, a bottom mounting plate and electric components affixed to said mounting plate within said cover;
at least one fluoresent tube having an upper socket within said cover, and depending through a hole in said mounting plate to a lower socket well below said plate;
a rubber sleeve extending around the upper portion of each said tube at each said hole to seal the same and prevent breakage;
a pair of electrodes, having their upper portions affixed to said mounting plate, and depending therebelow alongside said tube to a level well below said plate;
a protective cage depending from said mounting plate and extending entirely around said tube and electrodes at a spaced distance therefrom; and
a protective bottom member extending across the lower portion of said cage;
whereby said tube and electrodes are entirely enclosed by a non-electrified, protective enclosure and all electric components of said trap are protected from the elements within said cover.

* * * * *